Patented Aug. 19, 1947

2,426,147

UNITED STATES PATENT OFFICE 2,426,147

CEMENT MANUFACTURE

Knud Horn, New York, N. Y., assignor to F. L. Smidth & Co., New York, N. Y., a corporation of New Jersey No Drawing. Application January 9, 1945, Serial No. 572,095

10 Claims. (Cl. 106—103)

This invention relates to the manufacture of cement, and is concerned more particularly with a novel process for the manufacture of Portland cement, in which the raw material mix includes calcium sulphate serving as a source of lime. The new process makes possible the economical production of cement in localities where calcium sulphate in the form, for example, of gypsum, is available, but limestone, ordinarily used in cement manufacture, is not at hand and cannot be obtained and shipped in at reasonable cost. The process of the invention is simple, requires no special equipment, and permits the recovery and repeated use of certain of the materials employed. In addition, the process is not delicate or sensitive and its successful operation, therefore, does not require exact control of temperatures, quantities of certain materials used, etc.

It has been proposed heretofore to produce cement by the burning of a raw material mix, which contains gypsum, employed as a source of lime, and coal, acting as an agent for reducing the calcium sulphate content of the gypsum. In that process, the materials are finely divided and then burned and the combustion of the coal in intimate mixture with the calcium sulphate of the gypsum results in a reaction, the equation for which may be expressed as follows:

$$2CaSO_4 + C = 2CaO + 2SO_2 + CO_2$$

The lime thus formed then combines with the other ingredients in the mix to produce the compounds usually present in Portland cement. While this process is theoretically entirely feasible, it has not proven satisfactory in commercial practice and it has been used only to a limited extent.

The present invention is directed to the provision of a process for the production of Portland cement, in which calcium sulphate is used as a source of lime, and which overcomes the disadvantages of the prior process. In the new process, the reduction of the calcium sulphate is effected by the use of sulphur, in either elemental form or the form of iron pyrites or an organic sulphide, and the sulphur is oxidized in the process to $SO_2$, which may be recovered and employed for its usual purposes or reduced to elemental sulphur, part of which may then again be used in the process. In the reduction of the sulphate by sulphur, the reactions may be represented by the following equations:

$$4CaSO_4 + S_2 = 4CaO + 6SO_2$$

$$11CaSO_4 + 2FeS_2 = 11CaO + 15SO_2 + Fe_2O_3$$

The equation for the reaction in which an organic sulphide is used depends on the nature of the compound, but it will be readily understood, since the sulphur present is oxidized to $SO_2$ and the other elements in the compound are converted into gaseous oxides, water, etc.

In carrying out the new process, a finely divided mix of substances serving as a source of alumina and silica together with calcium sulphate in an amount capable upon reduction of providing the necessary quantity of lime is first prepared. To this mix is added the finely divided material providing the sulphur required for reduction of the calcium sulphate. The final mixture is then preferably nodulized by any of the usual methods and the nodules are burned. The burning may be carried on in any suitable apparatus, such as a rotary kiln, and is effected by means of any suitable fuel, such as gas, oil, or pulverized coal, and in the presence of an excess of air. The temperature at which the nodules are burned, is maintained below the temperature, approximately 2100° F., at which the eutectoids of calcium sulphate and its partially decomposed compounds will fuse, until the danger of such fusion has passed. Thereafter the temperature is raised until ultimately the clinkering temperature of about 2700° F. is reached. As the reduction of the sulphate by the use of sulphur in the forms above mentioned takes less time than the reduction by coal in the prior process, the retention time of the raw material in the kiln is shorter in the new process than in the prior one and the kiln is, therefore, capable of a greater output.

According to the equations above set forth, the stoichiometric amount of sulphur required for the reduction of calcium sulphate is about 11.7% of the sulphate by weight. However, I have found that much less than the stoichiometric amount of sulphur is necessary in the practice of the new process to reduce the calcium sulphate to lime, and when less than the stoichiometric amount of sulphur is used the reduction of the calcium sulphate takes place without the formation of appreciable amounts of calcium sulphide, for example, a quantity of sulphur amounting to only about 3.5% by weight of the calcium sulphate may be employed to effect complete reduction of the sulphate and oxidation of the sulphur content of the raw material to $SO_2$. With the use of such a relatively small amount of sulphur, the entire amount of sulphur present in the mixture being burned is substantially completely oxidized in the burning operation, so that there is no appreciable formation of calcium sulphide and the sulphate content of the clinker may be readily kept within the tolerances permitted by cement specifications.

The following example makes clear the practice of the process in the treatment of specific materials, but the application of the process to the treatment of other materials will be readily understood therefrom by those familiar with cement manufacture.

The calcium sulphate used was anhydrite of the following composition in percentages by weight:

| | |
|---|---|
| CaO | 38.30 |
| $SO_3$ | 53.20 |
| $SiO_2$ | 0.40 |
| $Al_2O_3$ | 0.21 |
| $Fe_2O_3$ | 0.09 |
| MgO | 0.00 |
| Loss on ignition | 6.15 |

To this material was added clay and silica sand in the proportions by weight of about 83% anhydrite, about 16.5% clay, and about 0.5% silica sand. The clay was of the following composition in percentages by weight:

| | |
|---|---|
| $SiO_2$ | 62.80 |
| $Al_2O_3$ | 14.97 |
| $Fe_2O_3$ | 6.88 |
| CaO | 2.38 |
| MgO | 1.63 |
| Loss on ignition | 8.13 |

The mix then had the following composition in percentages by weight:

| | |
|---|---|
| CaO | 32.33 |
| $SO_3$ | 44.45 |
| $SiO_2$ | 10.64 |
| $Al_2O_3$ | 3.10 |
| $Fe_2O_3$ | 1.10 |
| MgO | 0.36 |
| Loss on ignition | 7.35 |

The mix was ground to a fineness of 92% passing a 200 mesh sieve and a quantity of elemental sulphur amounting to about 5% by weight of the mix was added. This quantity of sulphur amounted to about 6% by weight of the calcium sulphate in the final mix.

The finely divided mix was then nodulized, although that operation is not essential, and then burned in a rotary kiln. Initially, the temperature to which the nodules were subjected was kept below that at which the eutectoids of calcium sulphate and its partially decomposed compounds fuse and, as the nodules progressed down the kiln, the temperature was raised. The temperature did not exceed that of fusion of the eutectoids until danger of their fusion had passed. Near the lower end of the kiln, the nodules were raised to a clinkering temperature of about 2700° F.

The clinker produced by the operations described was found to contain only 0.1% sulphur, indicating that in the process, the total sulphur content of the raw material mix had been substantially completely oxidized to $SO_2$. The clinker was then ground together with a quantity of about 3% of gypsum, in accordance with standard practice, in order to obtain normal cement. Upon analysis, the final ground product was found to contain the following constituents in percentages by weight:

| | |
|---|---|
| CaO | 61.50 |
| $SiO_2$ | 23.00 |
| $Al_2O_3$ | 8.00 |
| $Fe_2O_3$ | 3.16 |
| MgO | 1.00 |
| $SO_3$ | 1.85 |
| Insoluble residue | .40 |
| Loss on ignition | .80 |

On subjecting the cement to the usual physical tests, it was found that it had an initial setting time of one hour and fifty minutes and a final setting time of three hours and forty-five minutes. Its normal consistency was 24% and its tensile strength after three days was 200 lbs., after seven days, 275 lbs., and after twenty-eight days, 350 lbs. The cement was found to be of satisfactory soundness. The cement produced by the process will thus be seen to have normal properties for average cement of the chemical composition given, and these properties were in no way affected by the use of gypsum instead of limestone as the source of the lime content.

In the example given, the calcium sulphate used is anhydrite, but experience has shown that it is unimportant whether the calcium sulphate is the hydrated form or gypsum, calcined gypsum or plaster of Paris, or anhydrite. In all instances, it has been possible to effect the reduction of the sulphate in accordance with the process and to produce a product from which sulphur has been substantially completely eliminated.

As pointed out above, the sulphur used for the decomposition of the calcium sulphate may be either in the form of elemental sulphur, an organic sulphide, or iron pyrites. When organic sulphides or the pyrites are used, the amount employed will be such as to provide the necessary amount of sulphur to effect the reduction of the calcium sulphate. As the pyrites leave a residue of $Fe_2O_3$ in the final product, they may be employed to advantage where the calcium sulphate, clay, etc., used in preparing the mix to be burned do not contain that oxide or have an insufficient amount for the final cement composition. In the manufacture of low heat cement, a larger amount of $Fe_2O_3$ is employed than in ordinary cements and, frequently in the manufacture of cement, iron ore is mixed with the cement raw materials, if they do not contain enough iron oxide. It will be apparent that, in some instances, the pyrites cannot be used, because an undesirably large amount of $Fe_2O_3$ would be present in the cement. However, the process can be practiced by the use of sulphur in more than one form so that, in some operations, both pyrites and an organic sulphide or elemental sulphur or all three may be employed.

As I have stated, the amount of sulphur required for the reduction of the sulphate is less than that indicated as necessary by calculation from the reaction and as little as about 3.5% by weight of the sulphate may be used.

The $SO_2$ in the waste gases may be readily recovered and can be compressed and liquefied. This liquid $SO_2$ may then be used for any of the purposes for which it is customarily employed or, if desired, it may be reduced to elemental sulphur, in accordance with a well known procedure. Since it is possible without difficulty and at little expense to recover the SO₂ from the waste gases and convert it to elemental sulphur, it will be apparent that part of the sulphur employed in the process for the reduction of the sulphate may be recycled and this cuts down the cost of operation.

The method of decomposing calcium sulphate substantially free of sulphur to produce a solid residue substantially free from sulphur by heating a mixture of calcium sulphate and a member of the class consisting of sulphides readily reducible by heat and elemental sulphur, in which the amount of sulphides or elemental sulphur in the mixture is less than the stoichiometric amount to reduce the calcium sulphate, is claimed in my application, Serial No. 496,479, filed July 28, 1943.

In the appended claims in which I refer to "calcium sulphate material," I wish that term to be understood as covering gypsum, calcined gypsum, and anhydrous calcium sulphate, including anhydrite.

I claim:

1. A process for manufacturing cement which comprises preparing a finely-divided mixture of calcium sulphate material, alumina, and silica, and a quantity of material selected from the class consisting of FeS₂, organic sulphides, and elemental sulphur, the amount of said latter material providing substantially less sulphur than the stoichiometric amount to reduce the calcium sulphate present in the mixture to lime, and heating the mixture in an atmosphere of air until substantially the total sulphur present in the mixture is oxidized to SO₂ and clinker is formed.

2. A process for manufacturing cement which comprises preparing a finely-divided mixture of calcium sulphate material, alumina, and silica, together with a quantity of material selected from the class consisting of FeS₂, organic sulphides, and elemental sulphur, the quantity of said latter material used having a sulphur content of about 3.5% by weight of the calcium sulphate present, and heating the mixture in an atmosphere of air until substantially the total sulphur present in the mixture is oxidized to SO₂ and clinker is formed.

3. A process for manufacturing cement which comprises preparing a finely-divided mixture of calcium sulphate material, alumina, and silica, and elemental sulphur, the latter being present in an amount varying between about 3.5% to an amount substantially less than 11.7% by weight of the calcium sulphate present and heating the mixture in an atmosphere of air until substantially the total sulphur present in the mixture is oxidized to SO₂ and clinker is formed.

4. A process for manufacturing cement which comprises preparing a finely-divided mixture of calcium sulphate material, alumina, and silica, and elemental sulphur, the latter being present in substantially less than the stoichiometric amount to reduce the calcium sulphate present to lime, and heating the mixture in an atmosphere of air until substantially the total sulphur present in the mixture is oxidized to SO₂ and clinker is formed.

5. A process for manufacturing cement comprising preparing a finely-divided mixture containing about 83% anhydrite and about 17% clay, adding a quantity of material selected from the class consisting of FeS₂, organic sulphides, and elemental sulphur, said material being present in an amount having a sulphur content of at least 3.5% by weight of the calcium sulphate content of the anhydrite but substantially less than the stoichiometric amount to reduce the calcium sulphate content of the anhydrite to lime, and heating the final mixture in an atmosphere of air until substantially the total sulphur present in the mixture is oxidized to SO₂ and clinker is formed.

6. A process for manufacturing cement comprising preparing a finely-divided mixture containing about 83% anhydrite and about 17% clay, adding a quantity of material selected from the class consisting of FeS₂, organic sulphides, and elemental sulphur, said material being present in such amount that the sulphur content thereof is substantially less than the stoichiometric amount to reduce the calcium sulphate content of the anhydrite to lime, and heating the final mixture in an atmosphere of air until substantially the total sulphur present in the mixture is oxidized to SO₂ and clinker is formed.

7. A process for manufacturing cement which comprises preparing a finely-divided mixture containing alumina, silica, and an amount of calcium sulphate material capable, upon reduction, of providing the quantity of lime required for combination with the alumina and silica to produce cement, adding to the first mixture a quantity of material selected from the class consisting of FeS₂, organic sulphides, and elemental sulphur in an amount having a sulphur content substantially less than the stoichiometric amount to react with the calcium sulphate present to cause the sulphur therein and in said added material to be oxidized to SO₂, and heating the final mixture in an atmosphere of air until all the sulphur present in the final mixture is oxidized to SO₂ and clinker is formed.

8. A process for manufacturing cement which comprises preparing a finely-divided mixture containing alumina, silica, and an amount of calcium sulphate material capable, upon reduction, of providing the quantity of lime required for combination with the alumina and silica to produce cement, adding to the first mixture a quantity of material selected from the class consisting of FeS₂, organic sulphides, and elemental sulphur in an amount having a sulphur content of at least about 3.5% but substantially less than 11.7% by weight of the calcium sulphate present, and heating the final mixture in an atmosphere of air until all the sulphur present in the final mixture is oxidized to SO₂ and clinker is formed.

9. A process for manufacturing cement which comprises preparing a finely-divided mixture containing alumina, silica, and an amount of calcium sulphate material capable, upon reduction, of providing the quantity of lime required for combination with the alumina and silica to produce cement, adding to the first mixture a quantity of material selected from the class consisting of FeS₂, organic sulphides, and elemental sulphur in an amount such that the sulphur content thereof is substantially less than the stoichiometric amount to reduce the calcium sulphate present to lime, and heating the final mixture in an atmosphere of air until substantially the total sulphur present in the final mixture is oxidized to SO₂ and clinker is formed.

10. A process for manufacturing cement which comprises preparing a finely-divided cement raw material mix containing an amount of calcium sulphate material capable, upon reduction, of providing the quantity of lime required, adding to the mix a quantity of material selected from the class consisting of $FeS_2$, organic sulphides, and elemental sulphur, the quantity of said latter material used containing substantially less sulphur than the stoichiometric amount to reduce the calcium sulphate in the mix to lime, heating the mixture in an atmosphere of air through a range of temperatures up to about 2700° F. to effect preliminary reduction of the calcium sulphate present and oxidation of all the sulphur present to $SO_2$ and final formation of clinker, the temperature being kept below that of fusion of the eutectoids of calcium sulphate and its partially decomposed compounds until the danger of fusion of such compounds has passed.

KNUD HORN.

REFERENCES CITED

The following references are of record in the file of this patent:

UNITED STATES PATENTS

| Number | Name | Date |
|---|---|---|
| 1,801,741 | Hasselbach | Apr. 21, 1931 |

FOREIGN PATENTS

| Number | Country | Date |
|---|---|---|
| 682,121 | France | 1930 |